C. B. YAW.
TYPE WRITING MACHINE.
APPLICATION FILED APR. 2, 1907.
965,496.
Patented July 26, 1910.
5 SHEETS—SHEET 2.
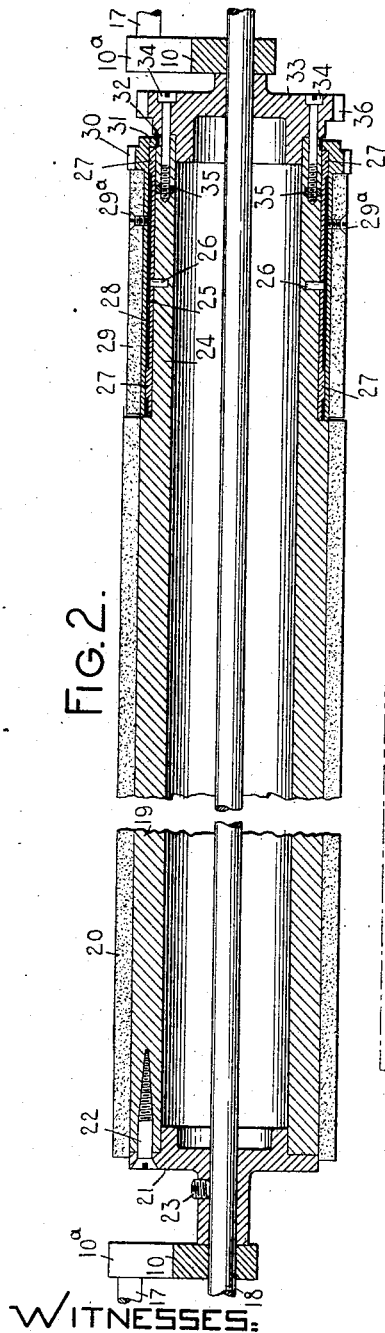
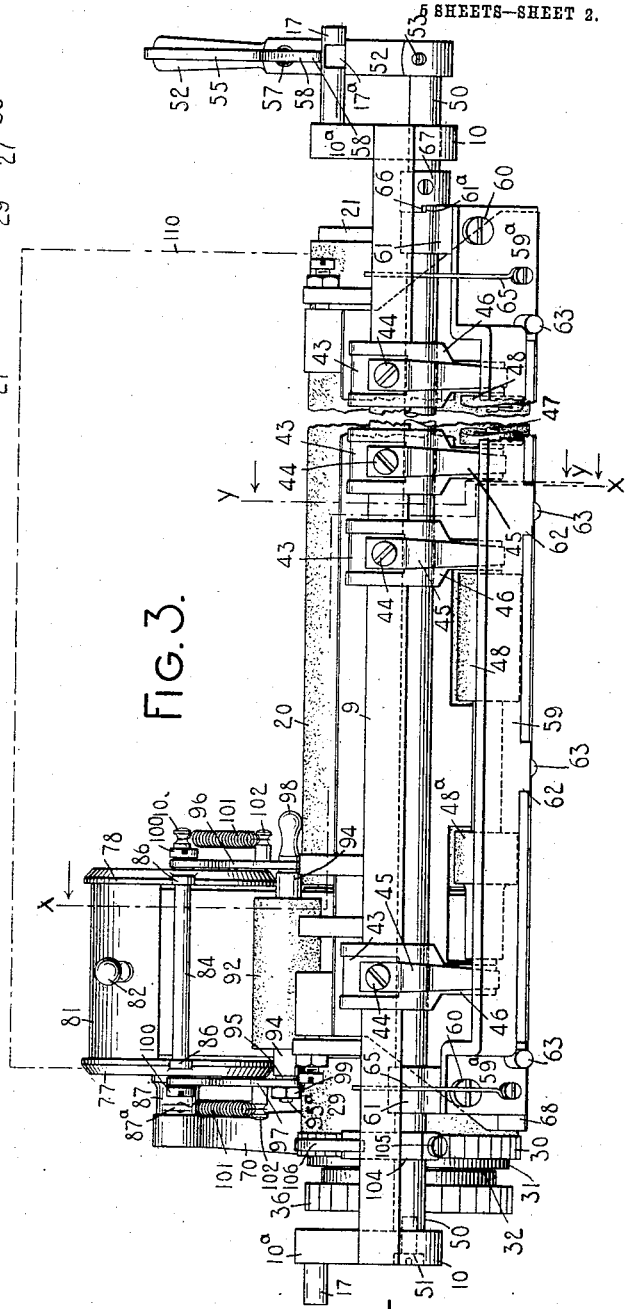
WITNESSES:
J. B. Reeves
M. W. Pool
INVENTOR:
Chas. B. Yaw
By Jacob Felbel
HIS ATTORNEY C. B. YAW.
TYPE WRITING MACHINE.
APPLICATION FILED APR. 2, 1907.
965,496.
Patented July 26, 1910.
5 SHEETS—SHEET 3.
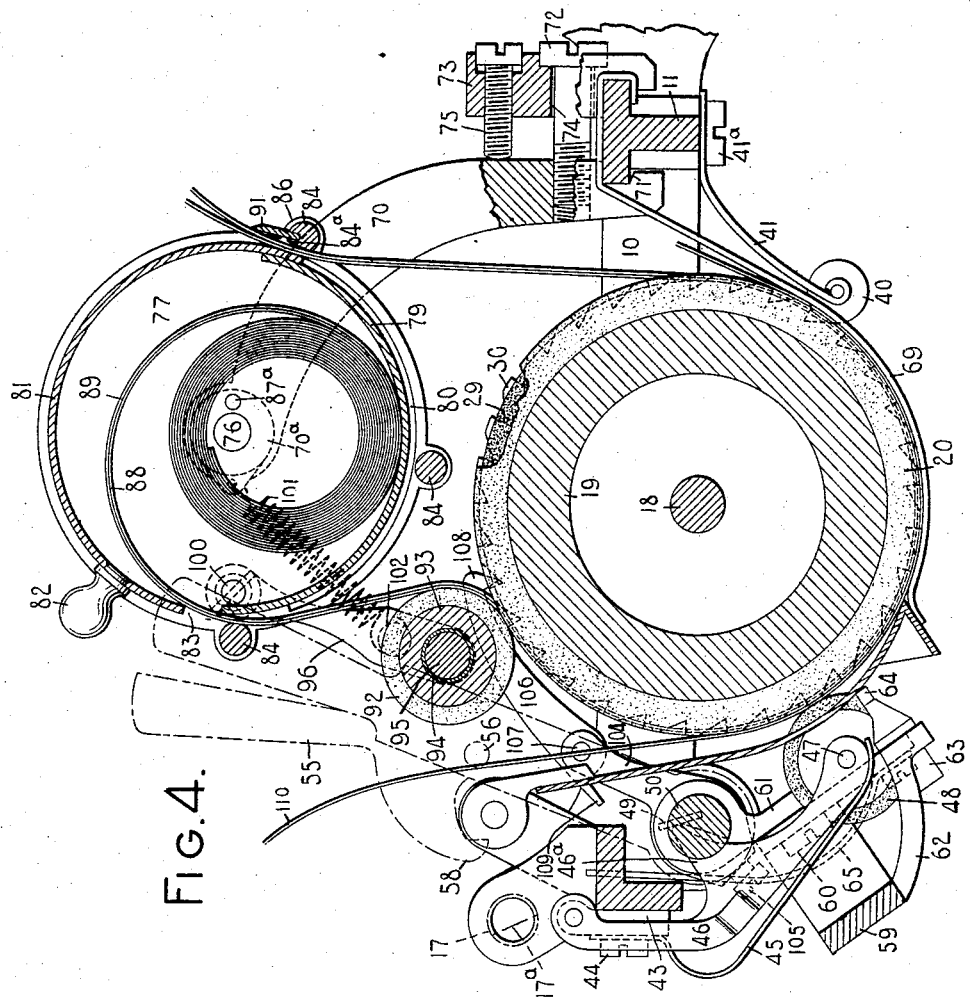

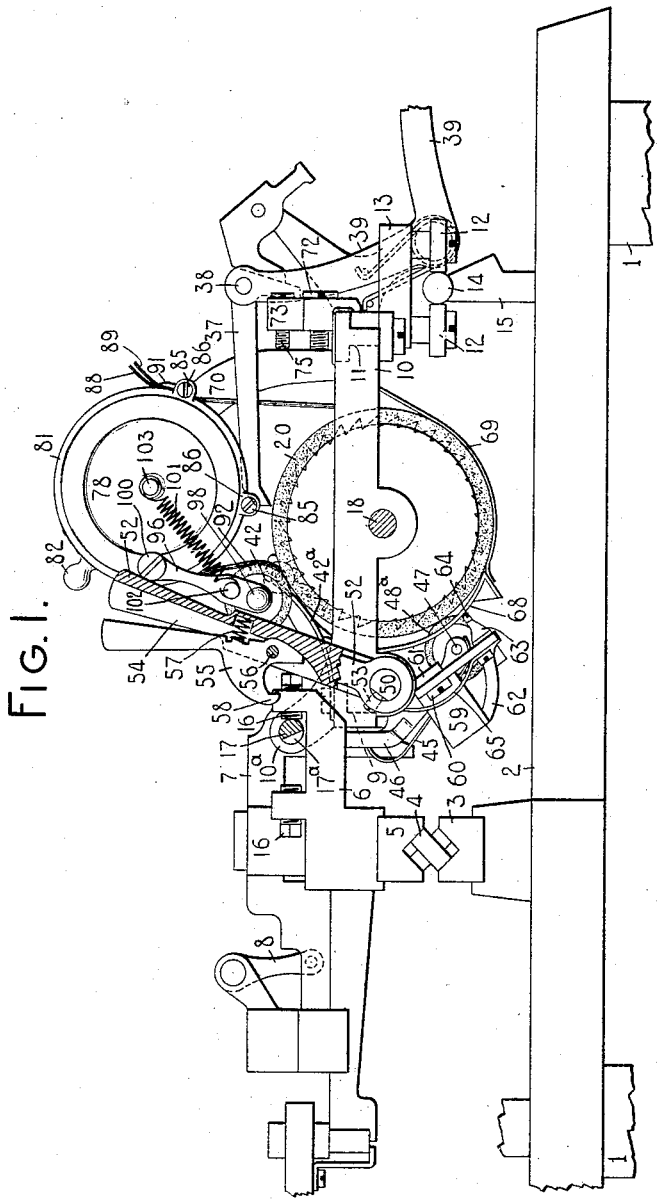

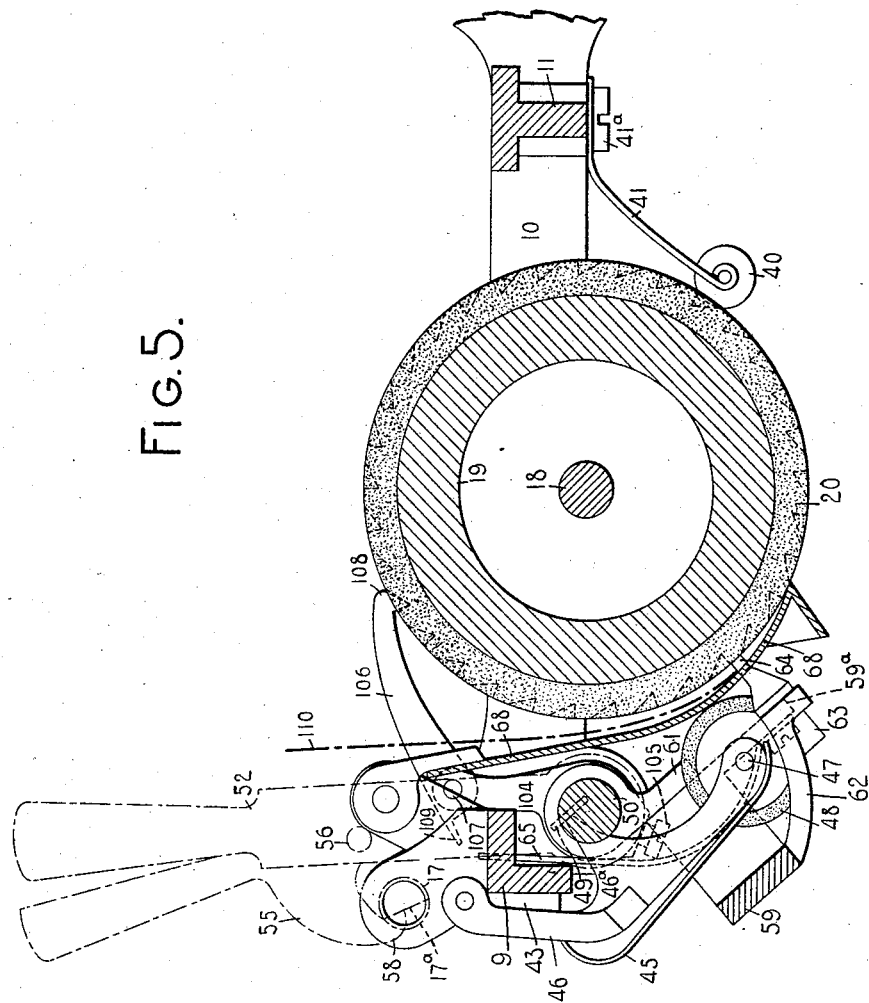

C. B. YAW.
TYPE WRITING MACHINE.
APPLICATION FILED APR. 2, 1907.

965,496.

Patented July 26, 1910.
5 SHEETS—SHEET 5.

WITNESSES:

INVENTOR:

HIS ATTORNEY

UNITED STATES PATENT OFFICE.

CLIO B. YAW, OF NEW YORK, N. Y., ASSIGNOR TO WYCKOFF, SEAMANS & BENEDICT, OF ILION, NEW YORK, A CORPORATION OF NEW YORK.

TYPE-WRITING MACHINE.

965,496.   Specification of Letters Patent.   Patented July 26, 1910.

Application filed April 2, 1907. Serial No. 365,954.

*To all whom it may concern:*

Be it known that I, CLIO B. YAW, citizen of the United States, and resident of the borough of Brooklyn, city of New York, in the county of Kings and State of New York, have invented certain new and useful Improvements in Type-Writing Machines, of which the following is a specification.

My invention relates to paper supply and paper feeding means for typewriting machines and its object, generally stated, is to provide improved devices of the classes specified.

To the above and other ends, the invention consists in the features of construction, combinations of devices and arrangements of parts hereinafter described and particularly pointed out in the claims.

My invention is concerned chiefly with providing improved supporting and feeding means for a tally or checking strip, which strip is advantageously employed to facilitate and improve the methods used in some systems of commercial billing, such, for example, as the system outlined in my companion application No. 365,953, filed April 2nd, 1907. In said companion application I have shown a tally strip mounted on a pair of rotary carriers which are arranged on the carriage of a typewriting machine, which tally strip is adapted to pass over one end of the platen around and outside of the bill sheet and to be automatically line spaced when certain paper controlling devices operative on the bill sheet are actuated.

In the present embodiment of my invention, a single tally strip holder is mounted on the carriage of the machine and the tally strip is fed from said holder over a short supplementary platen or platen section arranged at the right of the main platen or platen section and provided with separate paper feeding devices and separate line spacing devices which are operative by the stop positioning and paper releasing mechanism of the machine and independently of the line spacing mechanism which controls the main platen or platen section.

Figure 6:
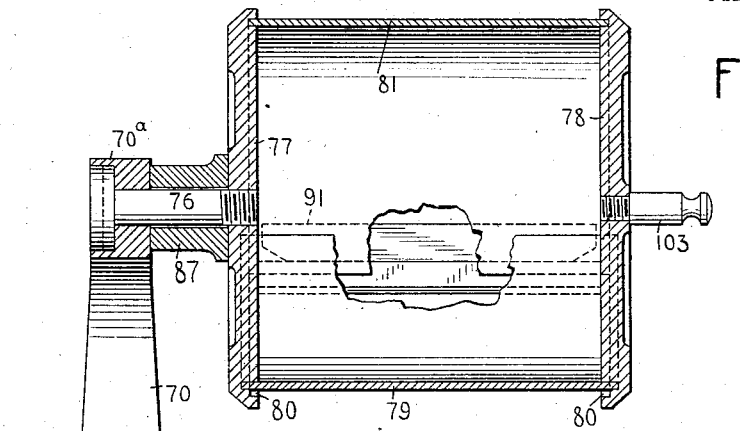
Figure 7:
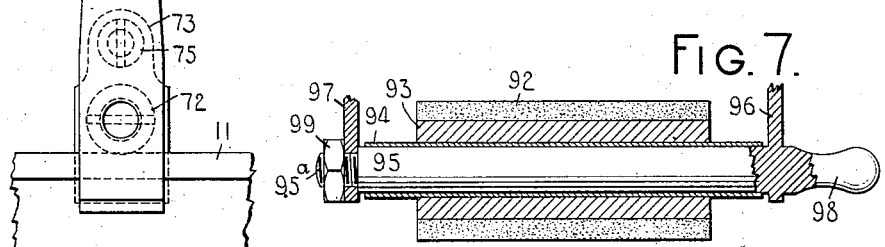
Figure 8:
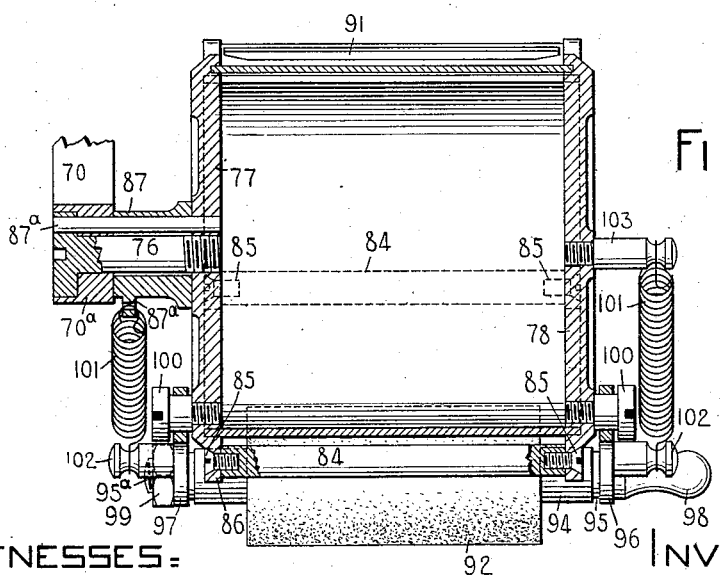

The details of the construction will be explained more fully in connection with the accompanying drawings, wherein, Figure 1 is a fragmentary end view, partly in section, of the upper part of a No. 8 Remington typewriting machine showing my invention applied thereto. Fig. 2 is a fragmentary longitudinal sectional view of the divided platen employed in the present instance. Fig. 3 is a fragmentary rear elevation of the platen carrier and platen of the machine and showing my invention. Fig. 4 is a fragmentary sectional view taken on planes represented by the dotted line $x$—$x$ in Fig. 3, said Fig. 4 being drawn to a larger scale than Fig. 3. Fig. 5 is a sectional view taken on a plane represented by the line $y$—$y$ in Fig. 3 and looking in the direction of the arrows at said line, parts shown in said Fig. 3 being omitted in Fig. 5 and other parts being shown in the latter figure in different positions from those in which they appear in Fig. 3. Fig. 5 is drawn to the same scale as Fig. 4. Fig. 6 is a vertical longitudinal sectional view of the tally strip holder as seen from the rear and looking forwardly, the support of said holder also being shown. Fig. 7 is a longitudinal sectional view of a supplementary feed roller and its mounting, said feed roller coöperating with the supplementary platen section. Fig. 8 is a horizontal longitudinal sectional view of the tally strip holder, the rear side of the holder being nearest the observer, said view also showing the supplementary feed roller supported on said holder.

Although I have shown my invention as applied to a No. 8 Remington typewriting machine, it is to be understood that said invention may be embodied in other forms of writing machines.

Referring first to Figs. 1, 2 and 3 of the drawings, the main frame of the machine comprises a base frame (not shown) from which rise corner posts 1 supporting a top plate 2. A fixed groove track-way 3 is supported on the top plate and receives bearing rollers 4, said rollers also coöperating with a grooved track-way 5 secured on a carriage truck 6. The usual connections, comprising slide bars 7 and links 8 connect the carriage truck with the platen carrier, said carrier comprising a rear bar 9, side or end bars 10 and a front bar 11. Guide rollers 12 carried by a bracket 13 fixed to the front bar of the carriage engage at opposite sides a shift rail 14 which is carried by arms 15 pivoted in the usual manner at their lower ends to the machine frame. The shift rail 14, it will be understood, is movable at will to shift the platen carrier fore-and-aft of the machine on the carriage truck, this shifting movement being for the purpose of changing from lower to upper case and vice versa and being limited by adjustable screw stops 16, supported on the carriage truck 6 and coöperating with stop pins 17 projecting laterally from the usual extensions or arms 10ª rising from the rear portions of the side bars 10. Besides its sliding motion on the carriage truck the platen carrier has a pivotal movement for the purpose of exposing the writing. The carriage truck and platen carrier comprise the platen carriage which supports a sectional or divided platen, the details of which are shown clearly in Fig. 2. The platen is supported on a shaft or axle 18 which has bearings on the side bars 10 of the platen carrier. The long or main platen or platen section comprises a wooden core 19 inclosed in a sheath 20 of rubber or the like. A platen head 21 is secured to the left end of the main platen section by wood screws 22, said platen head being fixed by a set screw 23 to the platen axle. The right-hand end portion of the core 19 is reduced as indicated at 24, and surrounding this reduced portion is a thin sheath of metal 25 which is prevented from turning relatively to the core by pins 26. Near its ends the sheath 25 is provided with raised circular tracks 27 which support and serve as bearings for the metal core 28 of the short or supplementary platen or platen section which further comprises a sheath 29 of rubber or the like secured in a fixed relation to the core 28 by screws 29ª. The short platen section is in the nature of a shell which is supported on and adapted to turn on the long platen section, said platen sections or platens having coincident axes of rotation. The outside diameter of the short platen section is somewhat less than the outside diameter of the long platen section, as clearly appears in Fig. 2. The right-hand end portion of the core 28 is thickened and formed with peripheral ratchet teeth 30 forming a ratchet wheel coöperative with supplementary line spacing devices hereinafter to be described. An extension 31 on the core 28 outside the ratchet teeth engages loosely in a groove formed between the end of the sheath 25 and a shoulder 32 formed on the right-hand platen head 33 of the main platen section. The platen head 33 is secured to the core 19 by long screws 34 which engage threaded openings in metal blocks 35 set in the core 19. The engagement of the annular extension 31 on the supplementary platen with the groove in the main platen prevents endwise movement of the supplementary platen relatively to the main platen, but permits said supplementary platen to turn freely on its support. The platen head 33 is provided with peripheral ratchet teeth 36 forming a ratchet wheel coöperative with which is the usual line spacing pawl 37 (Fig. 1), the latter being pivoted at 38 to the upper arm of an angular line spacing lever 39, which is operative in the usual way to communicate rotary line space movements to the main platen section. A roller detent 40 (Figs. 4 and 5), pivoted to a spring arm 41 secured to the under side of the front bar 11 of the platen frame by a headed screw 41ª, constantly engages with the ratchet teeth 30 on the supplementary platen section and tends to prevent turning movements of said section, except as hereinafter described. The construction is such that the supplementary platen section is not affected by the operation of the line spacing lever 39, so that the main platen section may turn while the supplementary platen section remains quiescent. The usual roller detent 42 (Fig. 1) carried on a spring arm 42ª suitably secured to the platen carrier, coöperates with the line spacing ratchet wheel on the main platen section to hold said platen section from accidental movement, and the construction is such that the main platen section may remain motionless while the supplementary platen section is turned as will more clearly appear hereinafter.

Referring now to the paper controlling devices for the main platen section, these are the same essentially as those shown in my companion application and will be only briefly described at this place, said companion application being available for a fuller description. As shown in Figs. 1, 3, 4 and 5, the supports for the main feed roller comprise two sets of brackets 43 secured by screws 44 to the rear bar 9 of the platen carrier, said screws also securing feed roller pressure springs 45 in place. Each bracket 43 pivotally supports a Y-shaped hanger arm 46, the hanger arms carrying feed roller shafts 47 on which are mounted feed roller sections 48. In the present case the feed roller section 48ª, nearest the supplementary platen section, is shortened somewhat more than the other feed roller sections 48, so that it terminates at one side of the supplementary platen section. It will be understood that each pair of hanger arms carries a feed roller shaft, the two hanger arms of each pair being spaced apart at one side of the middle of the platen frame. Each shaft 47 carries two feed roller sections so that in the present instance there are four feed roller sections in all, which are normally maintained in contact with the platen or the paper thereon by the pressure springs 45. It is to be understood, however, that though this is a convenient and efficient arrangement of the main feed roller, yet insofar as my present invention is concerned other arrangements of feed roller sections or a single long feed roller may be employed. Each hanger arm 46 is provided with a lug 46ª coöperative with which is a fin 49 fixed to a rock shaft 50 extending from side to side of the platen carrier at the rear thereof, said rock shaft at its right-hand end bearing on a screw pivot 51 and at its left-hand end extending through a bearing opening in the left-hand side bar 10 of the platen carrier and beyond said side bar. The rock shaft is controlled by a manually actuated arm 52 which is secured to the left end portion of the rock shaft by a set screw 53 (Figs. 1 and 3). The arm 52 is formed at its rear with a slot 54 which receives a detent or latch 55 pivoted at 56 and provided with a spring 57 and an engaging lug 58, the latter being coöperative with a notch or cut-away 17$^a$ formed in the left-hand stop pin 17.

A U-shaped stop frame or bar 59 extends lengthwise of the platen behind the main feed roller and is provided with ears 59$^a$ which receive headed screws 60 by which the stop frame is secured to bearing blocks 61, the latter being mounted loosely on the rock shaft 50. The stop bar is provided at intervals with curved arms 62 which carry housings 63 containing spring-pressed stop pins 64 which are adapted to contact with the platen between the sections of the main feed roller, although normally they are separated from the platen as clearly shown in Figs. 1 and 4 by wire springs 65 acting on the stop bar frame to hold the latter and the stop pins in the positions shown in said figures. As shown in the rear view (Fig. 3) the left-hand bearing block 61 is cut-away to form a shoulder 61$^a$ and coöperative with this shoulder is a shoulder 66 formed on a collar 67 fixed to the rock shaft 50. Normally these shoulders 61$^a$ and 66 are separated but when the rock shaft 50 is turned or rocked rearwardly by the arm 52 the shoulder 66 is adapted to engage with the shoulder 61$^a$ and overcoming the springs 65 to swing the stop bar 59 and stops 64 forwardly and upwardly toward the platen, bringing the stops 64 into contact with the platen or the paper thereon. The parts are arranged so that this movement of the stops 64 will not take place until after the main feed roller has been released or moved away from the platen by the coöperation of the fins 49 on the rock shaft 50 with the lugs 46$^a$ on the arms 46 which carry the main feed roller sections. It will be understood that when the arm 52 is pushed rearwardly and locked in the position indicated by the dotted lines in Fig. 5 (which locking is caused by the coöperation of the lug 58 with the notch 17$^a$ in the stop pin 17) the main feed roller will be released and the stop pins 64 will be rendered operative as shown in said Fig. 5.

In employing the paper controlling devices above described, which devices comprise a paper stop device and a paper feeding device, a work sheet may be entered in the machine over a paper table (not shown) and passed down between the usual paper apron 68 and the platen, thence between the platen and the feed rollers and then upward and outward between the platen and the usual paper fingers or devices which are conventionally shown in Fig. 1 and designated by the numeral 69. In systems of billing work in which the use of my present invention is contemplated and in which bills are rendered monthly or at other stated periods and entries on said bills are made from day to day during the month as purchases are made, it is important that each time the bill sheet is introduced into the machine for the purpose of printing a new item thereon, said bill sheet should be started to be fed forward by the line spacing devices from the same point in order that the first line or item of the new entry shall be spaced at a regular and proper distance from the last line of the immediately preceding entry. For this reason it is highly desirable to employ a device for properly alining and positioning the work sheet each time it is entered in the machine, such as the paper stop device above described. In employing this device in the present instance, after the entry on one bill has been written and it is desired to remove the written bill and introduce another bill into the machine, the operator first presses rearwardly against the arm 52 until the latter is locked in the position shown by the dotted lines in Fig. 5. By this movement of the arm 52 the bill sheet then in the machine will be released from the control of the main feed roller and the stops 64 will be brought into operative positions. The leading edge of the next bill sheet may now be introduced into the machine and moved downwardly over the paper table and paper apron and between the platen and the main feed roller until the leading edge of said bill sheet contacts with the stops 64. The locking of the main feed roller and the leading edge stop device in the positions illustrated in Fig. 5 enables the operator to have the use of both hands to enter the new bill sheet and square or aline it by the aid of the leading edge stops 64. It will be understood, however, that though this locking feature is a desirable one it is not essential in the present case. The bill sheet having been thus alined the arm 52 may be released and the parts of the paper controlling devices restored to normal position.

From the operations above described it will be understood that means are provided for squaring each bill sheet as it is introduced into the machine and for starting it off under the control of the line spacing devices from a predetermined position, which position is of course the same for all of the bill sheets.

The novel tally strip devices which I prefer to employ in the present instance will now be described. As best shown in Figs. 1, 3, 4 and 6 a curved supporting arm or bracket 70 is detachably secured to the front bar 11 near its right-hand end. Said arm or supporting bracket is notched as indicated at 71 to coöperate with the rearwardly extending lip of the front bar 11 and is connected by a headed screw 72 with a clamping plate 73 which is formed with a similar notch coöperating with the forward lip of the bar 11. The screw 72 passes loosely through an opening 74 in the clamping plate 73 and the latter is maintained in proper relation with the arm or bracket 70 by an adjusting device or headed screw 75 which is supported in the plate 73 and abuts against the arm 70. The construction is such that by means of the two screws 72 and 75 and the clamping plate 73, the arm 70 is maintained in a fixed relation with the platen carrier but may be readily removed therefrom by loosening the screws 72 and 75. The arm 70 curves upward and rearward over the supplementary platen section near its right-hand end and terminates above the platen in an enlargement or boss 70ª which is perforated to receive a headed screw 76 by which the tally strip holder or carrier is secured to the arm 70. The tally strip holder or carrier, as best shown in Figs. 6 and 8, comprises right and left-hand heads numbered respectively 77 and 78, the inner faces of said heads being formed with arcuate grooves which receive a trough-like shell or cradle 79, the front and back edges of which terminate slightly below the centers of the heads 77 and 78 as will be best understood from an inspection of Fig. 4. The heads 77 and 78 are also formed with an annular groove 80 outside the groove which receives the trough or cradle 79, said groove 80 serving as a track or way for a curved cover plate 81 the latter being provided with a handle 82 by which it may be turned back and forth in its grooved track-ways 80. The cover plate is illustrated in Fig. 4 in closed position and on inspection of this figure it will be noted that a narrow slot or passage-way 83 extends between the back edges of the cover plate 81 and the trough 79. By pressing the handle 82 forwardly the cover plate may be turned to widen the opening 83 until it is almost equal to the full diameter of the tally strip holder. In this latter position of the cover plate the supplementary work sheet or tally strip, subsequently to be described, may be readily inserted in its holder or removed therefrom. The heads 77 and 78 are connected by three rods or bars 84 which are spaced apart as shown in Fig. 4. Each of the rods passes from one head to the other and receives at each end a screw 85 which passes through an opening in a lug 86 projecting outwardly from the periphery of the head of which it forms a part. This construction is clearly shown in Fig. 8. By the means thus described the heads 77 and 78 are securely held in a fixed relation with each other. The right-hand head 77 (which is seen at the left side of the tally strip holder in Figs. 6 and 8) has a threaded opening at its center which coöperates with the screw 76 by which the tally strip holder is secured to the supporting arm 70. A sleeve 87 is arranged on the shank of the screw 76 between the arm 70 and the tally strip holder, said sleeve serving to properly position said holder with respect to the supplementary platen section. A pin 87ª (Fig. 8) passes through the head of the screw 76 and thence through the boss 70ª, the sleeve 87 and the head 77. Said pin prevents the accidental loosening of the screw 76 and also prevents the tally holder from turning relatively to its supporting arm 70. The supplementary work sheet or tally strip, designated by the numeral 88, is wound into a roll together with a strip of carbon paper 89 and inserted in the holder in which it loosely lies, or "floats" as it is termed. The outer or free ends of the tally and carbon strips are drawn through the opening 83 and downwardly between the trough 79 and the rear connecting bar 84, passing over the paper apron 68 and around the supplementary platen section and upwardly between the front of the cover plate 81 and the forward connecting rod or bar 84, the rear portion of which is cut away as indicated at 84ª. The forward bar 84 is provided with a groove in which is set a cutting blade 91 (Figs. 4, 6 and 8) by which the tally strip may be conveniently severed when desired. The paper apron 68 is a paper guiding device common to the two work sheets.

Supplementary paper feeding devices are provided for the tally and carbon strips, said devices comprising a supplementary feed roller which coöperates with the supplementary platen section. The details of this supplementary device or feed roller are best shown in Fig. 7. It comprises a sheath 92 of rubber or the like surrounding a wooden core 93 which is driven on a metal sleeve 94, the latter being adapted to turn on an axle or rod 95 which is supported near its ends by arms 96 and 97 which are hung from the tally strip holder. As shown in the drawings the arm 96 is integral with the axle 95, which axle terminates in a handle 98 extending beyond the arm 96. The opposite end of the axle is reduced and threaded as indicated at 95ª to receive the arm 97, the latter being provided with an opening which fits over the reduced portion 95ª and being clamped by a clamping nut 99 against the shoulder formed between the body of the axle and its reduced end 95ª. The construction is such that the arms 96 and 97 are normally fixed relatively to the axle but the arm 97 may be removed in order to permit of the withdrawal of the supplementary feed roller. The arms 96 and 97 extend upwardly and forwardly from the supplementary feed roller, as shown in Figs. 1, 3, 4 and 8 and are formed with round holes at their upper ends through which loosely pass headed and shouldered screws 100, said screws engaging threaded openings in the heads of the tally strip holder. Coiled springs 101 are secured at their lower ends to pins 102 projecting laterally from the arms 96 and 97. The upper end of the left-hand spring is hooked over a pin 103 projecting laterally from the head 78 and the upper end of the right-hand spring 101 is hooked on a lug 87ª formed in the sleeve 87 (Figs. 3 and 8). The springs 101 serve normally to maintain the supplementary feed roller in engagement with the supplementary platen section or with the paper thereon as shown in Figs. 1, 3 and 4. When desired, as when a new tally strip is to be introduced, the supplementary feed roller may be released or thrown up to inoperative position by means of the handle 98. Normally the supplementary feed roller is so positioned that it is coöperative with the tally and carbon sheets somewhat to the rear of the top of the platen.

The supplementary feed roller terminates at one side of the main platen section and does not therefore coöperate with the latter (see Fig. 3) and, as has already been explained, the main feed roller does not coöperate with the supplementary platen section. In other words, the main and supplementary platen sections have independent paper feeding devices. It will be apparent that when the supplementary platen section is turned in line spacing direction by means presently to be described, the supplementary feed roller will operate on the tally and carbon strips to feed them forward past the printing point and to unwind a corresponding portion from the floating roll or tally strip within the tally strip holder.

Referring now to the means for turning the supplementary platen section and line spacing the supplementary work sheet or tally strip, said means comprises an arm 104 which surrounds the rock shaft 50 near its right-hand end and is secured in a fixed relation therewith by a set screw 105 (Figs. 3, 4 and 5). The arm 104 extends upward and forward at the rear of the platen and at its upper end is pivotally connected with a gravity pawl 106 at 107. At its forward end the pawl 106 is provided with a pawl tooth 108 which engages with the ratchet wheel on the supplementary platen section and is prevented from being thrown back accidentally to inoperative position by a tail piece 109 extending rearwardly from the body of the pawl, said tail piece being adapted to contact with the rear or outer face of the arm 104. When the rock shaft 50 is rotated rearwardly by means of the arm 52 to operatively position the stops 64 and release the main feed roll, the arm 104 will be turned rearwardly with the rock shaft, moving the pawl 106 from the position indicated in Fig. 4 to that indicated in Fig. 5. This movement of the pawl effects, through the ratchet wheel 30, a turning movement of the supplementary platen section, resulting in a line space feeding movement being automatically communicated to the tally and carbon strips. When the rock shaft 50 is turned back to normal position the main feed roller and the stops 64 are restored to normal position in the usual way and the arm 104 and pawl 106 will be moved back to their normal positions, the pawl tooth 108 riding over the back of one of the teeth of the line spacing wheel 30 and dropping into the first notch between the teeth ahead or in advance of the last notch with which said pawl tooth had operatively engaged.

Referring now to certain features of the operation of my improvements, it will be understood that after the tally strip 88 and the carbon strip 89 have been introduced into their holder and initially positioned relatively to the short or supplementary platen section, as illustrated for example in Fig. 4, the arm 52 may be pushed rearwardly locking the main feed roller and stops 64 in the positions shown in Fig. 5 and automatically line spacing the tally and carbon strips. Then a bill sheet 110 may be introduced into the machine over the paper table and the paper apron 68 and alined against the stops 64. The right-hand side portion of the bill sheet, it is assumed, is provided with a daily total column and the bill sheet is so positioned widthwise that the right-hand side portion containing the daily total column overlies the unwound portion of the tally and carbon strips. This will be understood clearly from a consideration of Fig. 3 wherein the bill sheet is represented in dotted lines. From an inspection of Fig. 4 it will be seen that the bill sheet 110 is entered behind the supplementary feed roller. The supplementary feed roller constitutes a paper controlling device so arranged that work sheets (i. e. the bill sheet and tally strip) may be introduced at opposite sides of it and fed over the supplementary platen independently of each other, said paper controlling device coöperating with only one of said work sheets, namely the tally strip.

As has been stated, the supplementary platen section is slightly less in diameter than the main platen section. This is to accommodate the carbon and tally strips, so that though they are positioned on the short platen section, yet, nevertheless, that portion of the bill sheet overlying them will not be forced farther away from the axis of the main platen section than is the left-hand side portion of the bill sheet which lies against said main platen section.

The bill sheet 110 having been properly alined, the main feed roller and the stops may be released and then the main platen section may be line spaced by operating the line spacing lever 39 in the usual way or turning one of the platen finger wheels (not shown) to bring said bill sheet into position for receiving the first line or item of the entry to be written. After the first line has been written by operating the usual printing instrumentalities, causing impressions to be made on the bill sheet at the under side of the platen through the usual inking ribbon (not shown), the bill sheet may be line spaced by operating the lever 39 and any subsequent lines constituting the entry may be written upon it. During these line spacing movements of the bill sheet and main platen section, the supplementary platen section will remain quiescent or stationary and the right-hand side portion of the bill sheet will slide over the carbon and tally strips which will be maintained close against the under side of the supplementary platen section by the right-hand side portion of the bill sheet, but will not be advanced or line spaced. When the items on the bill have been completed the platen will be moved endwise toward the left until the daily total column on the bill sheet is in position for receiving the imprints of the types. As the daily total is printed the type impressions constituting it will be made simultaneously on the bill sheet 110 through the inking ribbon and simultaneously on the tally strip 88 through the carbon strip 89 interposed between the bill sheet and the tally strip. Thus it will be seen that all the impressions on the bill sheet are made through the inking ribbon, while the items on the tally strip are carbon copies.

The arm 52 may now be operated positioning the leading edge stops and releasing the bill sheet just written so that it may be withdrawn from the machine. The operation of the hand lever 52 automatically effects a line space turning movement of the short platen section and advances or line spaces the tally and carbon strips which will be moved forward over the right-hand side portion of the bill sheet just written. Consequently when the next bill sheet is entered, alined and written upon as before and the daily total is printed, said daily total will be reproduced on the tally strip a line space distance from the daily total of the preceding bill. The operations above outlined may be repeated at pleasure.

It will be apparent that when the entries on the day's bills have been completed their daily totals will be reproduced in condensed order on the tally strip.

Various changes may be effected within my invention and parts of it may be used without other parts.

What I claim as new and desire to secure by Letters Patent, is:—

1. In a typewriting machine, the combination with a divided or sectional platen, of means for turning or line spacing one section of the platen; and means operating automatically to line space or turn another section of the platen independently of the first section and its line spacing means.

2. In a typewriting machine, the combination with a platen comprising separate sections adapted for separate work sheets one overlapping the other, of paper controlling devices coöperative with one of said sections and the work sheet thereon; means for moving said devices into and out of working position; and means operated by said last named means for moving another of said sections to advance the work sheet thereon.

3. In a typewriting machine, the combination with a platen comprising separately rotatable sections and adapted to have separate work sheets on the different sections, of paper controlling devices coöperative with one of said sections and the work sheet thereon; means for moving said devices into and out of working position; and means operated by said last named means for turning another of said sections.

4. In a typewriting machine, the combination with a divided or sectional platen comprising a main section and a supplementary section and adapted to have a supplementary work sheet on the supplementary section and a main work sheet on the main section and partly overlying the supplementary work sheet, of paper controlling devices for the main work sheet; hand-actuated means for moving said devices into and out of working position; and means automatically operative by said hand-actuated means to turn the supplementary platen section.

5. In a typewriting machine, the combination of a divided platen comprising a plurality of sections; separate feed rollers coöperative with said sections and independent of each other; means for releasing one of said feed rollers, and means operative by said last named means for turning another of said feed rollers and the platen section with which it coöperates.

6. In a typewriting machine, the combination of a divided platen comprising a plurality of sections, each adapted to have a work sheet coöperative with it; a normally inoperative paper stop device coöperative with one of said sections; hand-controlled means for moving said stop device to operative position; and means operative by said hand-controlled means to advance a work sheet over another of the platen sections.

7. In a typewriting machine, the combination of a divided platen comprising a plurality of rotatable sections; a normally inoperative paper stop device coöperative with one of said sections; hand-controlled means for moving said stop device to operative position; and means operative by said hand-controlled means to turn another of the platen sections.

8. In a typewriting machine, the combination of a divided platen comprising a plurality of sections; feed rollers coöperating with said sections and independent of each other; a paper stop device normally inoperative; hand-controlled means for moving said paper stop device into position to coöperate with one of said platen sections; and means automatically operative by said hand-controlled means for turning another of said platen sections and causing it to coöperate with its feed roller to advance a work sheet in line spacing direction.

9. In a typewriting machine, the combination of a divided platen comprising a plurality of sections, feed rollers coöperating with said sections and independent of each other; a paper stop device normally inoperative; hand-controlled means for moving said paper stop device into position to coöperate with one of said platen sections and for moving the feed roller of that platen section out of coöperative position; and means operative by said hand-controlled means to turn another platen section and cause it to coöperate with its feed roller to advance a work sheet in line spacing direction.

10. In a typewriting machine, the combination of a carriage; a divided or sectional platen thereon; a paper stop device pivoted on said carriage and normally inoperative; means comprising a hand-controlled rock shaft mounted on the carriage for moving said paper stop device into position to coöperate with one of said platen sections; and means operative by said rock shaft for line spacing another of said platen sections.

11. In a typewriting machine, the combination of a carriage; a sectional platen mounted thereon; a paper stop device pivoted on said carriage and normally inoperative; separate and independent paper feed rollers coöperative with the sections of said platen; and normally operative means comprising a hand-controlled rock shaft for swinging said paper device into position to coöperate with one of said platen sections and for concurrently swinging the feed roller pertaining to that platen section out of operative position; a line spacing pawl coöperative with a ratchet wheel on another of said platen sections; and connections between said pawl and said rock shaft.

12. In a typewriting machine, the combination of a rotary platen comprising a comparatively long main section and a short supplementary section, said sections having coincident axes of rotation, each section adapted to support a separate work sheet so that one of said work sheets is superposed on the other; a guiding device common to the two work sheets; and means separately operative to advance said work sheets in line spacing direction.

13. In a typewriting machine, the combination of a rotary platen comprising a comparatively long main section and a short supplementary section, said sections having coincident axes of rotation and the supplementary section being slightly less in diameter than the main section, each section adapted to support a separate work sheet with the work sheet on the main section overlapping the work sheet on the supplementary section; separate paper feeding means for said platen sections; means for moving the paper feeding means of the main section into and out of working position; and means operating automatically to advance the supplementary work sheet when said last recited means is operated.

14. In a typewriting machine, the combination with a platen, of a feed roller arranged so that work sheets may be introduced at opposite sides thereof, said feed roller coöperating with the platen to feed one only of said work sheets, and separate means for advancing the other one of said work sheets, said feed roller and said separate means each coöperating with only one of said work sheets.

15. In a typewriting machine, the combination of a rotary platen; a paper feed roller coöperative with said platen and arranged so that work sheets may be introduced at opposite sides of said feed roller into the machine; means for advancing one of said work sheets without turning the platen; and means for advancing the other work sheet by turning the platen and causing the operation of said feed roller.

16. In a typewriting machine, the combination of a platen; a work sheet container; and a paper feeding device pivoted on said container and coöperative with the platen to feed the work sheet carried by said container.

17. In a typewriting machine, the combination of a carriage; a platen; a work sheet container mounted on said carriage; and a paper feed roller supported on said container and coöperative with the platen to feed the work sheet thereon.

18. In a typewriting machine, the combination of a carriage; a rotary platen thereon; a work sheet container supported on said carriage; and a paper feed roller pivotally mounted on said container and coöperative with the platen to feed the work sheet led from said container.

19. In a typewriting machine, the combination of a platen; a work sheet holder or container having a sliding cover and adapted to substantially inclose a rolled work sheet arranged loosely in said holder; and means for drawing said work sheet from said holder and feeding it over said platen.

20. In a typewriting machine, the combination of a platen carrier; a detachable device mounted on said platen carrier and comprising a container for a work sheet; guide rods for the work sheet, and a severing blade for said work sheet; and means for drawing said work sheet from said container and feeding it over said platen.

21. In a typewriting machine, the combination of a carriage; a platen; a supporting arm detachably secured to said carriage; a work sheet holder mounted on said arm; spring-pressed arms pivoted on said holder; and a feed roller rotatably supported on said arms and coöperative with the platen.

22. In a typewriting machine, the combination of a carriage; a rotatable platen supported on said carriage and comprising a main section and a supplementary section arranged end to end; separate line spacing devices for said platen sections; separate paper feeding devices for said platen sections; and a work sheet holder mounted on said carriage for supporting a work sheet in the form of a continuous strip which is adapted to be drawn over the supplementary platen section, the main platen section being adapted to support a main work sheet which overlies the supplementary work sheet.

23. In a typewriting machine, the combination of a carriage and a rotary platen comprising a main section and a supplementary section; separate pawl and ratchet devices for said sections operative to turn said sections independently; a tally strip holder supported on the carriage for carrying a tally strip which is adapted to be fed over the supplementary platen section; paper feeding devices coöperative with said platen sections; a paper stop device coöperative with the main platen section but normally inoperative; means including a hand-controlled rock shaft mounted on the carriage for moving said paper stop device into position to coöperate with the main platen section; and connections between said rock shaft and the pawl and ratchet line spacing devices of the supplementary platen section.

24. In a typewriting machine, the combination with a carriage and platen, of a tally strip holder comprising heads, a trough between said heads, clamping connections between said heads, and a movable cover for the trough.

25. In a typewriting machine, the combination with a carriage and platen, of a tally strip holder comprising heads, a trough between said heads, clamping connections between said heads, and a cover slidable in grooves in said heads.

26. In a typewriting machine, the combination with a carriage and platen, of a tally strip holder comprising heads, a trough between said heads, bars connecting said heads and held fixed by clamping screws, and a movable cover for the trough.

27. In a typewriting machine, the combination with a platen adapted to receive a main work sheet and a tally strip with the main work sheet in part overlying the tally strip so that they may be written on simultaneously and with said main work sheet separated from the platen by said tally strip, of a guiding device common to said main work sheet and said tally strip, and means for separately and independently line spacing said main work sheet and said tally strip.

28. In a typewriting machine, the combination of two roller platen sections, a paper feed roller coöperating with one of said sections to feed a sheet of paper, a paper feed roller coöperating with the other section to feed a strip of paper and so positioned that a wide sheet of paper mounted on the first section and overlapping the second section will not pass between said feed roller and the second section, and means for turning the two platen sections independently whereby said strip of paper can be mounted on the second section and the work sheet can be mounted on the first section and overlap the paper on the second section and either said strip or said work sheet can be fed independently of the other.

29. In a typewriting machine, the combination of a rotary platen comprising two sections, said sections having coincident axes of rotation so that a work sheet can be mounted on one section and another work sheet can be mounted on the other section and overlap the first work sheet, paper feed devices arranged to coöperate with the first work sheet and not with the second, and paper feed devices arranged to coöperate with the second work sheet and not with the first.

Signed at the borough of Manhattan, city of New York, in the county of New York and State of New York, this 1st day of April, A. D. 1907.

CLIO B. YAW.

Witnesses:
E. M. WELLS,
M. F. HANNWEBER.